(12) United States Patent
    Mart

(10) Patent No.: US 11,188,505 B2
(45) Date of Patent: *Nov. 30, 2021

(54) SYSTEM AND METHOD FOR BATCH DATABASE MODIFICATION

(71) Applicant: ServiceNow, Inc., Santa Clara, CA (US)

(72) Inventor: Joey Mart, San Marcos, TX (US)

(73) Assignee: ServiceNow, Inc., Santa Clara, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 16/530,561

(22) Filed: Aug. 2, 2019

(65) Prior Publication Data
US 2020/0026692 A1 Jan. 23, 2020

Related U.S. Application Data

(63) Continuation of application No. 15/279,886, filed on Sep. 29, 2016, now Pat. No. 10,387,385.

(51) Int. Cl.
    *G06F 7/00* (2006.01)
    *G06F 16/21* (2019.01)
    *G06F 16/22* (2019.01)

(52) U.S. Cl.
    CPC .............. *G06F 16/21* (2019.01); *G06F 16/22* (2019.01)

(58) Field of Classification Search
    CPC ...... G06F 16/21; G06F 16/22; G06F 16/2423; G06F 16/2386; G06F 17/30289; G06F 17/30312; G06F 17/30371
    See application file for complete search history.

(56) References Cited

U.S. PATENT DOCUMENTS

| | | | |
|---|---|---|---|
| 5,950,190 A | 9/1999 | Yeager et al. | |
| 5,978,594 A | 11/1999 | Bonnell | |
| 5,995,980 A * | 11/1999 | Olson | G06F 16/273 |
| 6,321,229 B1 | 11/2001 | Goldman | |

(Continued)

OTHER PUBLICATIONS

Episerver CMS, "Automatic Schema Updates", Documentation, Episerver CMS, New in 8.7, Last Updated May 25, 2015, http://world.episerver.com/documentation/Items/Developers-Guide/Episerver-CMS/8/Deployment/automaticschema-updates, downloaded Sep. 14, 2016, 3 pp.

(Continued)

*Primary Examiner* — Mohammed R Uddin
(74) *Attorney, Agent, or Firm* — Fletcher Yoder PC

(57) ABSTRACT

Altering a database structure based on software updates in a distributed computing system can include identifying a plurality of software updates that include alterations to structural elements in the database structure and identifying, for the plurality of software updates, a plurality of alterations corresponding to a first structural element of the structural elements. A combined alteration can be generated by combining the plurality of alterations. A database statement can be generated for altering the first structural element according to the combined alteration. The database structure can then be updated using the database statement. The structural elements can define logical relationships between data stored in the database structure. The alterations can be expressed using a markup language and the database statement can be expressed using a query language.

20 Claims, 9 Drawing Sheets

(56) References Cited

U.S. PATENT DOCUMENTS

| | | | |
|---|---|---|---|
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 10/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,657,576 B1 | 2/2010 | Norcott | |
| 7,685,167 B2 | 3/2010 | Mueller | |
| 7,689,628 B2 | 3/2010 | Garg | |
| 7,783,744 B2 | 8/2010 | Garg | |
| 7,814,080 B1* | 10/2010 | Luo | G06F 16/24542 707/703 |
| 7,877,783 B1 | 1/2011 | Cline | |
| 7,890,802 B2 | 2/2011 | Gerber | |
| 7,930,396 B2 | 4/2011 | Trinon | |
| 7,933,927 B2 | 4/2011 | Dee | |
| 7,941,506 B2 | 5/2011 | Bonal | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,090,700 B2 | 1/2012 | Horii | |
| 8,151,261 B2 | 4/2012 | Sirota | |
| 8,224,683 B2 | 7/2012 | Manos | |
| 8,266,096 B2 | 9/2012 | Navarrette | |
| 8,280,917 B1* | 10/2012 | Wei | G06F 16/2365 707/802 |
| 8,346,752 B2 | 1/2013 | Sirota | |
| 8,352,470 B2 | 1/2013 | Chen et al. | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,683,032 B2 | 3/2014 | Spinelli | |
| 8,689,241 B2 | 4/2014 | Naik | |
| 8,745,040 B2 | 6/2014 | Kowalski | |
| 8,812,539 B2 | 8/2014 | Milousheff | |
| 8,818,994 B2 | 8/2014 | Kowalski | |
| 8,868,482 B2 | 10/2014 | Murthy | |
| 8,743,121 B2 | 11/2014 | Behnia | |
| 8,887,133 B2 | 11/2014 | Behnia | |
| 8,907,988 B2 | 12/2014 | Poston | |
| 9,015,188 B2 | 5/2015 | Behne | |
| 9,037,536 B2 | 9/2015 | Mayfield | |
| 9,137,115 B2 | 9/2015 | Mayfield | |
| 9,261,372 B2 | 2/2016 | Cline | |
| 9,323,801 B2 | 4/2016 | Morozov | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,535,934 B1 | 1/2017 | Bahl et al. | |
| 9,613,070 B2 | 4/2017 | Kumar | |
| 9,631,934 B2 | 4/2017 | Cline | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 4/2018 | Spinelli | |
| 10,002,203 B2 | 6/2018 | George | |
| 2002/0138787 A1 | 9/2002 | Pal | |
| 2003/0225798 A1 | 12/2003 | Norcott | |
| 2005/0165802 A1 | 7/2005 | Sethi | |
| 2005/0228798 A1 | 10/2005 | Shepard | |
| 2008/0059953 A1 | 3/2008 | Sawa | |
| 2009/0055445 A1* | 2/2009 | Liu | G06F 16/258 |
| 2009/0100031 A1 | 4/2009 | Gilligan | |
| 2009/0216809 A1* | 8/2009 | Horii | G06F 16/24534 |
| 2009/0313630 A1 | 12/2009 | Hori | |
| 2010/0281458 A1 | 11/2010 | Paladino | |
| 2010/0293209 A1 | 11/2010 | Bireley | |
| 2011/0173619 A1 | 7/2011 | Fish | |
| 2012/0278282 A1* | 11/2012 | Lu | G06F 16/27 707/634 |
| 2015/0286668 A1 | 10/2015 | Legler | |
| 2016/0110439 A1 | 4/2016 | Hrle | |
| 2017/0192873 A1* | 7/2017 | Ozdemir | G06F 8/658 |

OTHER PUBLICATIONS

Happle, Mike; "Combining Query Results With The UNION Command", http://databases.about.com/od/sql/a/union.him, Date Unknown, downloaded Sep. 14, 2016, 3 pp.

Rabeler, Carl; "How to Use Batching To Improve SQL Database Application Performance", Updated: Feb. 4, 2016, 26 pp.

Microsoft, "Combine the Results of Several Select Queries By Using a Union Query", Applies to: Access 2007, https://support.office.com/en-us/article/Combine-the-results-0f-several-select-queries-by-using-a-union-query-3856f16c-Oa22-43f2-8c23-29ec44acbc05, Date Unknown, downloaded May 4, 2016, 7 pp.

* cited by examiner

```
500
502   <TABLE NAME="TBL_1">
          <FIELD NAME="ID" TYPE="INT"/>
          <FIELD NAME="short_description" TYPE="VARCHAR" SIZE="100"/>
504       <FIELD NAME="priority" TYPE="INT"/>
506       <FIELD NAME="state" TYPE="INT"/>
      </TABLE>
508
```

```
<TABLE NAME="TBL_1">
    <FIELD NAME="ID" TYPE="INT"/>
    <FIELD NAME="short_description" TYPE="VARCHAR" SIZE="100"/>
    <FIELD NAME="priority" TYPE="INT"/>
    <FIELD NAME="state" TYPE="INT"/>
    <FIELD NAME="FLD_1" TYPE="VARCHAR" SIZE="40"/>
</TABLE>
```
600

304B

```
<TABLE NAME="TBL_1">
    <FIELD NAME="ID" TYPE="INT"/>
    <FIELD NAME="short_description" TYPE="VARCHAR" SIZE="255"/>
    <FIELD NAME="priority" TYPE="INT"/>
    <FIELD NAME="state" TYPE="INT"/>
</TABLE>
```
602

304C

```
<TABLE NAME="TBL_1">
    <FIELD NAME="ID" TYPE="INT"/>
    <FIELD NAME="short_description" TYPE="VARCHAR" SIZE="255"/>
    <INDEX NAME="indexN"/>
        <FIELD NAME="state" TYPE="INT"/>
        <FIELD NAME="priority" TYPE="INT"/>
    <INDEX/>
</TABLE>
```
604, 606, 608

304D

```
<TABLE NAME="TBL_1">
    <FIELD NAME="ID" TYPE="INT"/>
    <FIELD NAME="short_description" TYPE="VARCHAR" SIZE="100"/>
    <FIELD NAME="priority" TYPE="INT"/>
    <FIELD NAME="state" TYPE="INT"/>
    <FIELD NAME="FLD_1" TYPE="VARCHAR" SIZE="100"/>
</TABLE>
```
610

SYSTEM AND METHOD FOR BATCH DATABASE MODIFICATION

CROSS REFERENCE TO RELATED APPLICATION

The present disclosure is a continuation of and claims priority to U.S. patent application Ser. No. 15/279,886, entitled, "SYSTEM AND METHOD FOR BATCH DATABASE MODIFICATION," filed on Sep. 29, 2016, which is herein incorporated by reference in its entirety for all purposes.

TECHNICAL FIELD

The present disclosure is generally related to information technology, including computer-implemented methods, systems, and apparatuses for batch database modification in an electronic computing and communication system.

BACKGROUND

An electronic computing and communication system may include one or more communicating and computing elements, which may, in the course of communicating and computing, store information in data storage constructs, such as databases. Using databases may include configuring and maintaining the databases, which may include complex operations that utilize significant computing resources and diminish database performance.

SUMMARY

Disclosed herein are aspects of database modification in an electronic computing and communication system.

In an implementation, a method is provided for altering a database structure based on software updates in a distributed computing system. The method comprises identifying a plurality of software updates that include alterations to structural elements in the database structure. The method further comprises identifying, for the plurality of software updates, a plurality of alterations corresponding to a first structural element of the structural elements. The method further comprises generating a combined alteration by combining the plurality of alterations, wherein one or both of redundant or conflicting alterations are resolved when generating the combined alteration. The method further comprises generating a database statement for altering the first structural element according to the combined alteration. The method further comprises updating the database structure using the database statement.

In an implementation, a system is provided for altering a database structure based on software updates in a distributed computing system. The system comprises a memory and a processor. The memory includes instructions executable by the processor to identify a plurality of software updates that include alterations to structural elements in the database structure. The memory further includes instructions executable by the processor to identify, for the plurality of software updates, a plurality of alterations corresponding to a first structural element of the structural elements. The memory further includes instructions executable by the processor to generate a combined alteration by combining the plurality of alterations, wherein one or both of redundant or conflicting alterations are resolved when the combined alteration is generated. The memory further includes instructions executable by the processor to generate a database statement for altering the first structural element according to the combined alteration. The memory further includes instructions executable by the processor to update the database structure using the database statement.

In an implementation, a method is provided for altering a database structure based on software updates in a distributed computing system. The method comprises determining that a plurality of alterations associated with the software updates corresponds to a structural element in a database structure. The method further comprises generating a combined alteration using the plurality of alterations. The method further comprises updating the structural element using a database statement generated according to the combined alteration.

These and other aspects of the present disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

FIG. 5 shows an example of instructions referencing database structural elements in accordance with implementations of this disclosure.

FIG. 6 shows examples of instructions including requested modifications to database structural elements in accordance with implementations of this disclosure.

DETAILED DESCRIPTION

Figure 1:
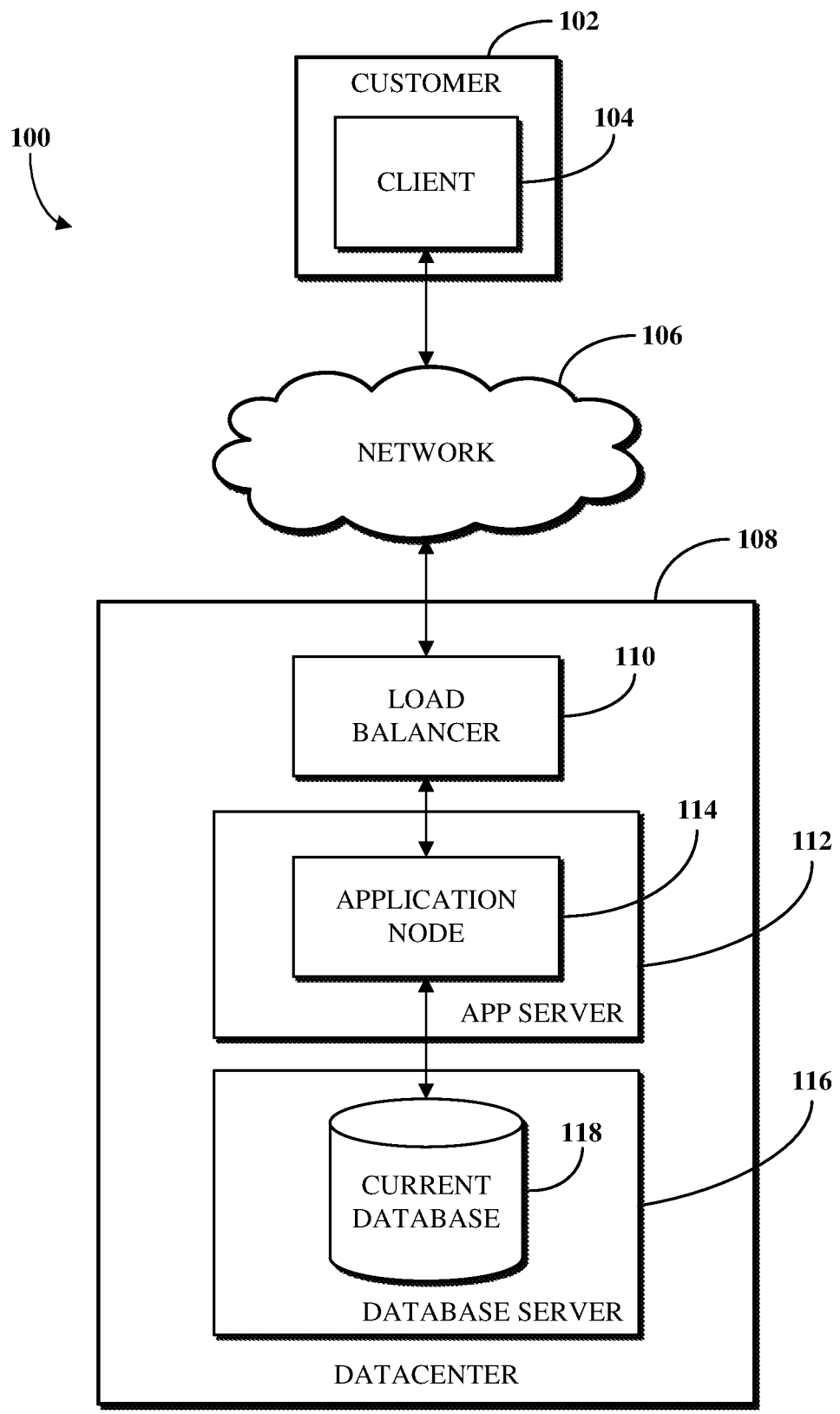
FIG. 1 is a diagram of an example of an electronic computing and communication system in accordance with this disclosure.

An electronic computing and communication system may include computing devices for delivering software services over a computer network. Various configurations of the computing devices and software services are available within the electronic computing and communication system. In some cases, the electronic computing and communication system may include a datacenter having server devices for delivering distributed software services to customers of a cloud computing service provider. For example, the service provider may operate platform software on the server devices as part of a Platform-as-a-Service (PaaS) cloud computing environment. Customers of the PaaS service provider may develop application software using the platform software and which can be delivered to clients of the customer. In some cases, the electronic computing and communication system may include server devices operated by a software developer distributing application software developed outside of a PaaS cloud computing environment. Clients of the software developer can communicate with the server devices to execute the software over a network.

Information accessible by software executed in an electronic computing and communication system may be stored in data storage units or logical constructs, such as databases. The use of a database may include the configuration and management of the database. For example, using a database may include modifying the database to change one or more database structural elements (e.g., tables, columns, objects, documents, etc.) defining how data is stored in the database. Requests to modify, or alter, a database are referred to herein as "requested modifications" or "alterations" and may derive from multiple distinct sources. For example, a PaaS service provider may generate a requested modification within a patch to modify a database in connection with an update to platform software. In another example, a software developer may generate a requested modification within a plugin to modify a database based on changes to application software, which may be developed independent of or using platform software.

Requested modifications can be included, without limitation, within plugins, patches, version upgrades, or the like. A requested modification may be or include instructions indicative of changes to be made to one or more structural elements of a database. In some cases, the instructions may be expressed using a markup language, for example, the eXtensible Markup Language (XML). Modifying a database based on a set of requested modifications typically includes individually converting requested modification into individual database statements and then applying the database statements to the database. Generally, a database statement is a statement, instruction, or other command that can be processed in connection with a database. For example, a database statement can include creating, inserting, retrieving, selecting, querying, searching for, updating, or deleting data within a database. Database statements may be expressed in a data manipulation language (DML) or data description language (DDL), for example, the structured query language (SQL).

A traditional approach for modifying a database is to include requested modifications directed to separate database structural elements in distinct sets of instructions (e.g., distinct XML files). The instructions of the set are individually processed and applied to the database to effectuate the modifications. However, because modifying a database may include performing complex operations that may utilize significant computing resources, individually applying database modifications may diminish the performance of computing devices operating the database and may include repeatedly rebuilding and removing the database from use while modifications are being applied. For example, when software utilizing a database is updated, there may be hundreds of plugins to be processed in connection with the update, which plugins can derive from a service provider, a customer of the service provider, an independent software developer, other entities, or a combination thereof. Multiple plugins may include requested modifications to a single database structural element. Individually applying these requested modifications would consume substantial system resources, resulting in a considerable load on the computer network within which the update is being processed.

Implementations of the present disclosure include performing database modifications in a two-pass process. In the first pass, requested modifications to a database can be identified and batch modification statements can be generated. In some implementations, generating batch modification statements may include identifying multiple requested modifications to a database, which may be received from one or more sources. The requested modifications may be evaluated to identify multiple requested modifications directed to a common database structural element. Those multiple requested modifications may be combined into a single batch requested modification, which may be converted into one or more database statements usable to update the database. As generally used herein, the batch requested modification is not simply the aggregation of multiple discrete modification or alter statements and running the aggregated modifications in a single batch, but rather refers to the construction of a single modification or alter step per storage table (or other data structure) and the execution of a single modification or alter step per storage table (or other data structure). In the second pass, the database statements may be applied (e.g., executed, interpreted, or the like) such that the converted requested modifications, when applied to the database, result in an updated database being generated. Modifying a database by converting and applying batch requested modifications, as opposed to individual requested modifications, may improve database performance and reduce the number of system resources consumed in connection with a software update, for example, by omitting repeated rebuilding or removal of the database from use. As used herein, the terms "update" and "modify" are given the same meaning when describing changes to make to a database, unless the context explicitly indicates otherwise.

The systems and methods of the present disclosure address problems particular to computer networks, for example, those concerning the processing of multiple database modifications as part of updating a database. These computing network-specific issues can be solved by implementations of the present disclosure. For example, by identifying a common database structural element associated with multiple requested modifications, the multiple requested modifications can be combined into a single batch requested modification and converted into a single database statement to be applied to the database. The single database statement can be processed using substantially fewer system resources than the individual database statements that would otherwise be applied had the multiple requested modifications been individually converted and processed. The implementations of the present disclosure thus introduce new and efficient improvements in the ways in which databases can be modified and may serve to improve the speed and/or efficiency of one or more processor-based systems configured to support or utilize the database.

The preceding overview is provided to enable a basic or general understanding of various aspects of the non-limiting embodiments that follow and the accompanying drawings. This overview is not intended as an exhaustive or complete description. Instead, the purpose of this overview is to introduce some concepts of this disclosure as a prelude to the following more detailed descriptions of the various embodiments.

To describe some implementations in greater detail, reference is first made to examples of hardware structures. FIG. 1 is a diagram of an example of an electronic computing and communication system 100 in accordance with this disclosure. As used herein, the term 'electronic computing and communication system,' or variations thereof, may be, or include, a distributed computing system, such as a client-server computing system, a cloud computing system, a clustered computing system, or the like.

An electronic computing and communication system 100 includes a customer 102. A customer may have clients, such as client 104 for customer 102. A client 104 is a computing system, which may include one or more computing devices, such as a mobile phone, a tablet computer, a laptop computer, a notebook computer, a desktop computer, or other computing device, or combination of computing devices. In some implementations, the client 104 may be implemented as a single physical unit, or a combination of physical units. In some implementations, a single physical unit may include multiple clients. In some implementations, the client 104 may be an instance of an application running on a customer device of the customer 102. As used herein, the term 'application' may include applications, programs, instances, processes, threads, services, plugins, patches, application version upgrades, or other identifiable computational aspect capable of accessing or interacting, directly or indirectly, with a database. The electronic computing and communication system 100 may include a number of customers or clients or may have a different configuration of customers or clients than as shown in FIG. 1. For example, there may be hundreds or thousands of customers and each customer may have a number of clients. Although not shown separately in FIG. 1, a customer may include a customer network or domain. For example, the client 104 of the customer 102 may be within a customer network or domain.

The electronic computing and communication system 100 includes a datacenter 108. The datacenter 108 includes servers, such as the application server 112 and the database server 116. A datacenter, such as datacenter 108, may represent a geographic location, which may include a facility, where servers are located. The electronic computing and communication system 100 may have a number of datacenters and servers or may have a different configuration of datacenters and servers than as shown in FIG. 1. For example, there may be tens of datacenters and each datacenter may have hundreds or a number of servers. Although not shown expressly in FIG. 1, a datacenter 108 may correspond with one or more datacenter networks or domains, which may be domains other than the client domain.

The client 104 and the servers of the datacenter 108 are configured to connect to, or communicate via, a network 106. In some implementations, a client 104 of a customer 102 may connect to the network 106 via a communal connection point, link, or path. In some implementations, a client 104 of a customer 102 may connect to, or communicate via, the network 106 using a distinct connection point, link, or path. A connection point, link, or path may be wired, wireless, or may include a combination of wired and wireless mediums.

The network 106 can, for example, be the Internet. In some implementations, the network 106 may be, or include, a local area network (LAN), a wide area network (WAN), a virtual private network (VPN), or other public or private means of electronic computer communication capable of transferring data between a client, such as the client 104 of the customer 102, and a server of the datacenter 108, or a combination thereof. The network 106, the datacenter 108, or another element, or combination of elements, of the electronic computing and communication system 100 may include network hardware such as routers, switches, load balancers, other network devices, or combinations thereof. For example, datacenter 108 may include a load balancer 110 for routing traffic from network 106 to various servers of the datacenter 108.

The load balancer 110 may route, or direct, computing communication traffic, such as signals and messages, to respective elements of the datacenter 108. For example, the load balancer 110 may operate as a proxy, or reverse proxy, for a service, such as an Internet-delivered service, provided by the datacenter 108 to one or more remote clients, such as the client 104, via the network 106. Routing functions of the load balancer 110 may be configured directly or via a Domain Name System (DNS). The load balancer 110 may coordinate requests from remote clients, such as the client 104, and may simplify client access by masking the internal configuration of the datacenter 108 from the remote clients. Request coordination may include maintaining information for sessions, such as sticking sessions, between a client and a service or application provided by the datacenter 108. For example, maintaining information for a sticky session may include maintaining information to forward requests associated with a session from a client to an identified element of the datacenter 108 for the session. A load balancer 110 may operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers may be included both within and outside of the datacenter 108.

The servers of the datacenter 108 include an application server 112 and a database server 116. In some implementations, the application server 112 or the database server 116 may be a computing system, which may include one or more computing devices, such as a desktop computer, a server computer, or another computer capable of operating as a server. In some implementations, the application server 112 or the database server 116 may be non-hardware servers implemented on a physical device, such as a hardware server. In some implementations, the application server 112 and the database server 116 can be implemented as a single hardware server or as a single non-hardware server implemented on a single hardware server. In some implementations, a number of applications servers or database servers can be implemented at the datacenter 108. In some implementations, the datacenter 108 can include servers other than or in addition to the application server 112 or the database server 116, for example, a web server.

The application server 112 includes an application node 114, which is a process executed on the application server 112, for example, for delivering services to a client 104 as part of a web application. The application node 114 may be implemented using processing threads, virtual machine instantiations, or other computing features of the application server 112. In some implementations, the application node 114 may store, evaluate, or retrieve information from a database, such as the current database 118 of the database server 116. In some implementations, the application server 112 may include a number of application nodes depending upon system load or other active features. For example, the application server 112 may include two or more nodes forming a node cluster. In some implementations, the application nodes implemented on a single application server 112 can run on different hardware servers.

The database server 116 is configured to store, manage, or otherwise provide data for delivering services to the client 104 over the network. The database server 116 includes a data storage unit, such as a current database 118 accessible by an application executed on the application server 112. In some implementations, the current database 118 may be implemented as a relational database management system (RDBMS), an object database, a document database, a configuration management database (CMDB), a management information base (MIB), one or more flat files, or the like or a combination thereof.

In some implementations, a CMDB may include records representing one or more entities, devices, or units of the electronic computing and communication system 100, such as the customer 102, the client 104, the network 106, the datacenter 108, the load balancer 110, the application server 112, the application node 114, the database server 116, the current database 118, or another element, portion of an element, or combination of elements of the electronic computing and communication system 100. The CMDB may include information describing the configuration, the role, or both, of an element of the electronic computing and communication system 100. In some implementations, a MIB may include one or more databases listing characteristics of the elements of the electronic computing and communication system 100. In some implementations, an object identifier (OID) may represent object identifiers of objects or elements in the MIB.

In some implementations, one or more databases, such as the current database 118, tables, or other information sources, or portions or combinations thereof, may be stored, managed, or otherwise provided by one or more of the elements of the electronic computing and communication system 100 other than the database server 116, such as the client 104 or the application server 112.

Some or all of the systems and methods described herein may operate on the servers of the electronic computing and communication system 100. For example, an update for an application executed on the application node 114 of the application server 112 can include updating the current database 118 to an updated database within the database server 116. In some implementations, the systems and methods described herein, portions thereof, or combinations thereof, may be implemented on a single device, such as a single server, or a combination of devices, for example, a combination of the client 104, the application server 112, or the database server 116.

In some implementations, devices other than the client 104, the load balancer 110, the application server 112, and the database server 116 shown may be included in the electronic computing and communication system 100. In some implementations, one or more additional servers may operate as an electronic computing and communication system infrastructure control, from which servers, clients, or both, may be monitored, controlled, configured, or a combination thereof.

In some implementations, the network 106, one or more datacenters, such as the datacenter 108, and one or more load balancers, such as the load balancer 110, may be implemented within a distributed computing system. In some implementations, a load balancer 110 of a distributed computing system may communicate with the network 106, the datacenters (e.g., the datacenter 108), other load balancers, or a combination thereof. In some implementations, a load balancer 110 of the distributed computing system may be configured to perform route communications to a primary datacenter, identify a failover condition, such as an enumerated failover condition, at the primary datacenter, and redirect communications to a secondary datacenter until the failover condition is resolved. Although shown as a single unit in FIG. 1, a load balancer 110 may be implemented as multiple physical or logical units. For example, a distributed computing system may include distinct routing units, load balancing units, firewall units, or the like.

The primary datacenter may include a primary database, such as the current database 118, and the secondary datacenter may include a secondary database. In some implementations, the secondary database may include an exact or substantially exact mirror, copy, or replication of the primary database.

An application node 114 implemented within a distributed computing environment may connect to, and communicate with, the primary database, which may be located in the datacenter 108 in which the application node 108 is located, or in another datacenter 108. For example, a primary datacenter may include a primary database, and a first set of application nodes. A secondary datacenter may include a secondary database and a second set of application nodes. The application nodes of the first and second sets may provide a service or application to remote clients, and may read or write data in the primary database. The secondary database may mirror changes made to the primary database and prevent write operations performed directly on the secondary database. In the event a failover condition is identified at the primary database of the primary datacenter, the secondary database of the secondary datacenter may become the primary database and may allow read and write access to data. The primary database at the primary datacenter may then become the secondary database, mirror the new primary database, and prevent direct write access to the new secondary database.

In some implementations, a distributed computing system can allocate resources of a computer network using a multi-tenant or single-tenant architecture. Allocation resources in a multi-tenant architecture may include installations or instantiations of servers, such as application servers, database servers, or another server, or combination of servers, that may be shared amongst multiple customers. For example, a web server, such as a unitary Apache installation, an application server, such as a unitary Java Virtual Machine, a single database server catalog, such as a unitary MySQL catalog, may handle requests from multiple customers. In some implementations of a multi-tenant architecture, the application server, the database server, or both can distinguish between and segregate data and other information of the various customers using the system.

In a single-tenant infrastructure, separate web servers, application servers, database servers, or combinations thereof, can be provisioned for each customer, or customer sub-unit. In some implementations, each customer, or customer sub-unit, may access one or more dedicated web servers, have transactions processed using one or more dedicated application servers, and have data stored in one or more dedicated database servers, catalogs, or both. Physical hardware servers may be shared such that multiple installations or instantiations of web servers, application servers, database servers, or combinations thereof, may be installed on the same physical server. Each installation may be allocated a portion of the physical server resources, such as RAM, storage, communications bandwidth, and processor cycles.

In some implementations, a customer instance may include multiple web server instances, multiple application server instances, multiple database server instances, or a combination thereof. The server instances may be physically located on different physical servers and may share resources of the different physical servers with other server instances associated with other customer instances. In a distributed computing system, multiple customer instances may be used concurrently. Other configurations and implementations of customer instances may also be used.

Figure 2:
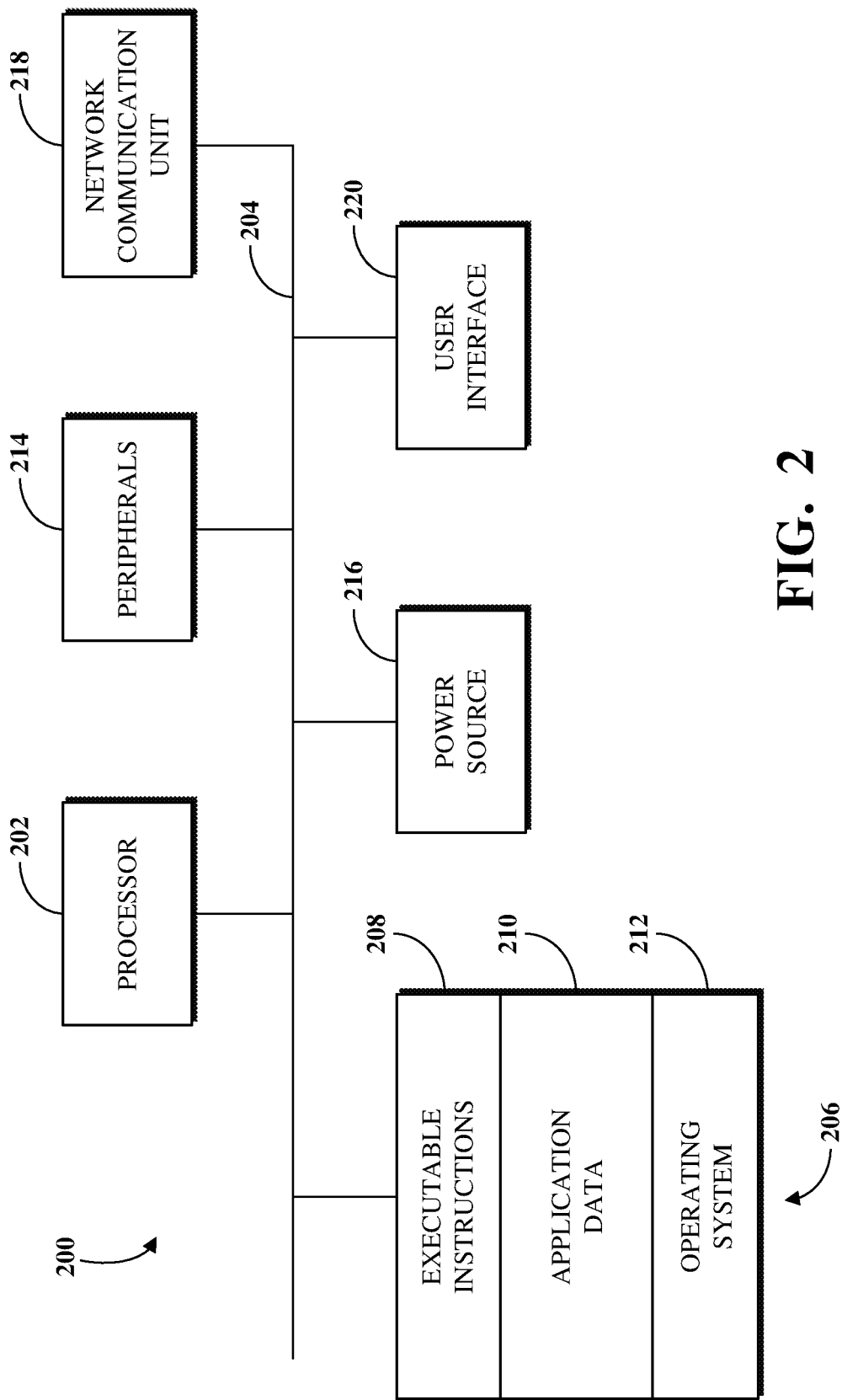
FIG. 2 is a block diagram of an example internal configuration of a computing device of the electronic computing and communication system shown in FIG. 1.

FIG. 2 is a block diagram of an example internal configuration of a computing device 200, such as a client 104 or a server, such as an application server 112 or a database server 116, of the electronic computing and communication system 100 shown in FIG. 1. As previously described, a client or server may be a computing system including multiple computing devices, or a single computing device, such as a mobile phone, a tablet computer, a laptop computer, a notebook computer, a desktop computer, a server computer, or the like.

A computing device 200 can include components or units, such as a processor 202, a bus 204, a memory 206, peripherals 214, a power source 216, a network communication unit 218, a user interface 220, or the like or a combination thereof.

The processor 202 can be a central processing unit (CPU), such as a microprocessor, and can include single or multiple processors, each having single or multiple processing cores. The processor 202 can include single or multiple processors each having single or multiple processing cores. Alternatively, the processor 202 can include another type of device, or multiple devices, capable of manipulating or processing information now-existing or hereafter developed. For example, the processor 202 may include multiple processors interconnected by hardwire or network, including a wireless network. In some implementations, the operations of the processor 202 can be distributed across multiple physical devices or units that can be coupled directly or across a local area or other network. Although not shown separately in FIG. 2, the processor 202 may include a cache, or cache memory, for local storage of operating data and instructions.

In some implementations, the memory 206 may include volatile memory, non-volatile memory, or a combination thereof. For example, the memory 206 may include volatile memory, such as one or more DRAM modules such as DDR SDRAM, and non-volatile memory, such as a disk drive, a solid state drive, flash memory, Phase-Change Memory (PCM), or a form of non-volatile memory capable of persistent electronic information storage, such as in the absence of an active power supply. In some implementations, the memory 206 can include another type of device, or multiple devices, capable of storing data or instructions for processing by the processor 202, now-existing or hereafter developed. The processor 202 may access and manipulate data in the memory 206 via the bus 204. Although shown as a single block in FIG. 2, the memory 206 may be implemented as multiple units. For example, a computing device 200 may include volatile memory, such as RAM, and persistent memory, such as a hard drive or other storage.

The memory 206 can include executable instructions 208, data, such as application data 210, an operating system 212 or a combination thereof, for immediate access by the processor 202. The executable instructions 208 can include, for example, one or more application programs, which may be loaded or copied, in whole or in part, from non-volatile memory to volatile memory to be executed by the processor 202. The executable instructions 208 may be organized into programmable modules or algorithms, functional programs, codes, code segments, or combinations thereof, to perform various functions described herein. For example, in the present context the executable instructions 208 can include instructions to identify related requested modifications to a database, generate a batch document including combined, related requested modifications, convert the combined, related requested modifications into a single query, and apply the single query to update a database, such as the current database 118 of FIG. 1. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, Linux®, or an operating system for a small device, such as a smart phone or tablet device, or a large device, such as a mainframe computer. The memory 206 may comprise one or multiple devices and may utilize one or more types of storage, such as solid state or magnetic.

The peripherals 214 can be coupled to the processor 202 via the bus 204. The peripherals can be sensors or detectors, or devices containing a number of sensors or detectors, which may monitor the device 200 itself or the environment around the device 200. For example, a computing device 200 may contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200 as may be contemplated. In some implementations, the power source 216 may be a battery, and the computing device 200 may operate independently of an external power distribution system. The components of the computing device 200, such as the peripherals 214 or the power source 216 may communicate with the processor 202 via the bus 204.

The network communication unit 218 can also be coupled to the processor 202 via the bus 204. In some implementations, network communication unit 218 can comprise one or more transceivers. The network communication unit 218 can, for example, provide a connection or link to a network, such as the network 106 shown in FIG. 1, via a network interface, which may be a wired network interface, such as Ethernet, or a wireless network interface. For example, the computing device 200 may communicate with other devices via the network communication unit 218 and the network interface using one or more network protocols, such as Ethernet, TCP, IP, power line communication (PLC), WiFi, infrared, GPRS, GSM, CDMA, or the like.

A user interface 220 can include a display, a positional input device, such as a mouse, touchpad, touchscreen, or the like, a keyboard, or another human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 may include a display, which may be a liquid crystal display (LCD), a cathode-ray tube (CRT), a light emitting diode (LED) display, such as an OLED display, or the like.

Other implementations of the internal architecture of clients and servers may be used. For example, a client or server may omit the peripherals 214. The operations of the processor 202 can be distributed across multiple machines which can be coupled directly or across a local area or other network. The memory 206 can be distributed across multiple machines such as network-based memory or memory in multiple machines performing the operations of clients or servers. Although depicted here as a single bus, the bus 204 can be composed of multiple buses, that may be connected to each other through various bridges, controllers, and, or adapters.

Figure 3:
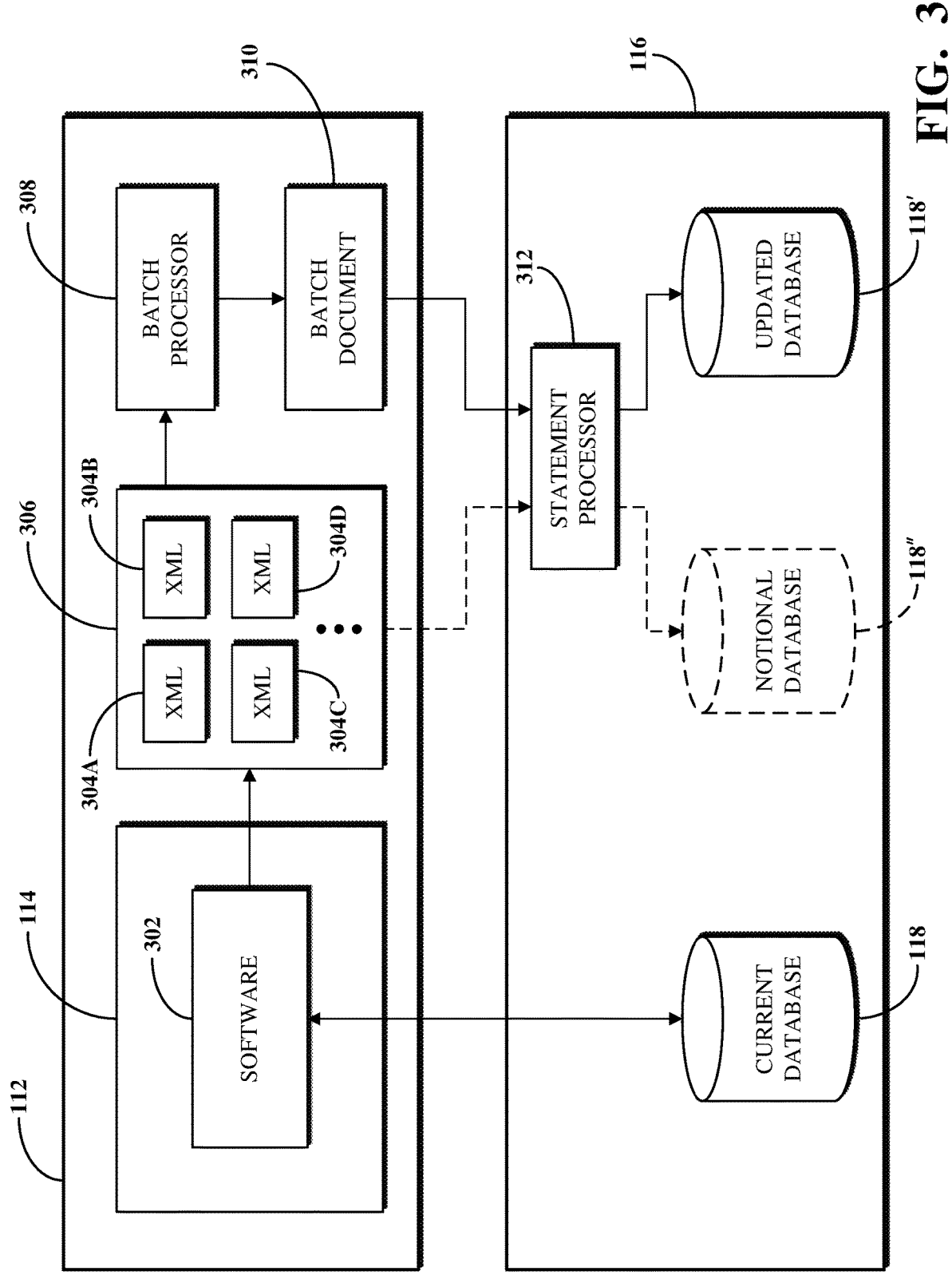
FIG. 3 is a block diagram of an example of updating a computer-implemented database in accordance with implementations of this disclosure.

FIG. 3 a block diagram of an example of updating a computer-implemented database in accordance with implementations of this disclosure. The updating may include generating and applying database statements for batch requested modification using one or more computing devices, for example, server devices operating at a datacenter, such as the datacenter 108 shown in FIG. 1. The database statements can be applied to a database operating within the datacenter 108, such as the current database 118 shown in FIG. 1. The updating of the current database 118 may correspond to an update to software 302 executing at the datacenter 108, which software 302 accesses the current database 118 during operation. The updating of the current database 118 can include reading, writing, or both, by the software 302.

The current database 118 operates on a database server 116. Although not shown in the figure, the database server 116 may implement one or more database nodes for operating the current database 118. In some implementations, the current database 118 can be a relational database including database structural elements such as tables and the like for logically relating records (e.g., rows of the tables) to attributes (e.g., columns of the tables). In some implementations, the current database 118 can be an object database including database structural elements such as fields of objects programmatically included within corresponding software and pointers for linking objects. In some implementations, the current database 118 can be a document database including database structural elements such as stores for document objects (e.g., XML files, JavaScript Object Notation files, or the like). The current database 118 may be another type of database suitable for storing data accessible by software 302.

The software 302 is a set of instructions, the execution of which includes accessing the current database 118. In some implementations, the software 302 can be platform software operated by a PaaS service provider. The PaaS service provider can execute distinct instances of the platform software for its respective customers, such that a customer can access its instance of the platform software by communicating with a server device executing the instance. In some implementations, an instance of platform software executes on an application server 112 that can implement an environment for the platform software (e.g., a Java Virtual Machine) on an application node 114. In some implementations, the application server 112 can implement multiple application nodes 114 to execute the instance of platform software.

Updating platform software can include upgrading a current version of the platform software to a newer version (e.g., updating version 2.0 to version 3.0), downgrading the current version to an earlier version (e.g., updating version 2.0 to version 1.0), applying a patch or a plugin to update portions of the platform software (e.g., updating version 2.0 to version 2.1), or the like. Instructions for performing the update can specify modifications to be made to the manner in which the current database 118 stores the data accessible by the platform software. For example, the update to the platform software may include functionality not previously included in the platform software, such as functionality that uses a first set of database structural elements not previously included in the current database 118, but which does not use a second set of database structural elements that is present in the current database 118. As such, the update of the current database 118 can include a first requested modification to add the first set of database structural elements and a second requested modification to remove the second set of database structural elements.

A database structural element defines or describes some aspect of the structure for storing data in the database. The database structural element can refer to a database schema including logical relationships between the stored data. In some implementations, the database structural element may be described or defined in whole or in part using DML, DDL. In some implementations, the database structural element may be described or defined using another programming language, such as a markup language, the instructions of which may be converted (e.g., programmatically) to a form, such as a database statement, interpretable or executable by the database. A database structural element may also be referred to as a structural element in a database structure.

In some implementations, the database structural elements associated with the current database 118 depend on the database type of the current database 118. For example, where the current database 118 is a relational database, a database structural element may define or describe all or a portion of one or more tables. A table may be defined to store or organize data in a specified structure, such as in an organized collection of fields or columns. A field, or column, of a table may indicate a structure for an information storage element and the definition or description of a field may indicate a data type for the field, such as float, integer, binary, character, or the like, a name for the field, a description for the field, one or more limitations or constraints for the field, zero or more relationships between the field and one or more other objects in the database, or other field information or combination of field information. A table definition may include information indicating an order of elements, such as fields, within the table, relationships among the elements, relationships between the table, or one or more elements of the table, and other objects within the database, limitations or constraints on the table, a table name, a table description, or other table information, or combination of table information.

In another example, where the current database 118 is an object database, a database structural element may define or describe all or a portion of the stores used to store data for objects defined using a corresponding programming language (e.g., used to develop the software 302). An object may be defined to include multiple variables native to a corresponding programming language or configured by a developer. The object database may include a store having the variables defined for a given object, as well as multiple other stores for storing values of those variables for different instances of the object (e.g., as the object instances are loaded into memory during an execution of the software 302). In some implementations, a store of the object database can be an array. The stores may include pointers to variables of other objects. For example, a store for a first object may include a pointer associating a variable of the first object to a variable of a second object within a different store.

In another example, where the current database 118 is a document database, a database structural element may define or describe all or a portion of the stores used to store data for document objects, such as XML, JSON, or other files. A document object can have a file extension and may be referenced using a pointer in memory. In some implementations, a store of the document database may be associated with a single document object type (e.g., an XML store, a JSON store, a PDF store, etc.). In some implementations, a store of the document database may be associated with multiple document object types. A store of a document database may include keys for identifying document objects stored within it. In some implementations, metadata for a store can be configured such that the store is able to identify contents of document objects stored within it. For example, a store for document objects including information about client logins can be configured using metadata to identify timestamps within the document objects. This information can be useful for identifying trends in client login times for the software 302.

Other configurations are possible for database structural elements. In some implementations, a database structural element may define or describe one or more data management or manipulation elements, such as views, indexes, triggers, stored procedures, or the like.

In some implementations, the current database 118 may include one or more internal data elements or objects for storing or maintaining information for managing the current database 118. For example, the current database 118 may include a database dictionary or catalog that may include a representation of the database structural elements associated with the current database 118. In some implementations, the current database 118 may include an internal database dictionary, which may be a database dictionary maintained automatically by the current database 118; a managed database dictionary, which may be a database dictionary maintained separately from the internal database dictionary, such as by external application software; or an internal database dictionary and a managed database dictionary.

Updating the current database 118 includes modifying one or more database structural elements based on the requested modifications. In some implementations, the instructions for the requested modifications may be created or modified for manipulating the current database 118 and may be stored internally, such as within the current database 118, or externally, such as in files stored in a file system external to the current database 118. For example, a software installation or modification package may include instructions for installing or modifying the software 302, such as plugin activations, patches, version upgrades, or the like, which may include instructions for requested modifications to the current database 118.

In some implementations, the requested modifications, including the database structural elements to be modified thereby, can be or include instructions expressed using a markup language, such as XML, or other format. In some implementations, instructions for the requested modifications may be stored within one or more structured documents 304A, 304B, 304C, 304D that can be processed in connection with an update to the current database 118. In some implementations, a structured document 304A, 304B, 304C, 304D can be a markup language file, such as an XML file. In some implementations, a structured document 304A, 304B, 304C, 304D can be another type of file that includes markup language instructions expressing one or more requested modifications. In some implementations, a structured document 304A, 304B, 304C, 304D can be a document, record, file, or other data containing information usable for instructions for modifying the current database 118.

In some implementations, a requested modification can be or include instructions that explicitly direct changes to one or more database structural elements. For example, the structured documents 304A, 304B, 304C, 304D may include instructions that explicitly indicate the creation or modification of one or more tables or columns within the current database 118, which tables or columns may be expressed in the instructions. In some implementations, a requested modification can be or include instructions that implicitly direct changes to one or more database structural elements. For example, the structured documents 304A, 304B, 304C, 304D may include instructions that implicitly indicate the creation or modification of one or more tables or columns based on logical relationships within the current database 118, which logical relationships may be expressed in the instructions. In some implementations, a structured document 304A, 304B, 304C, 304D can express a single requested modification to be processed for updating the current database 118. In some implementations, a structured document 304A, 304B, 304C, 304D can express multiple requested modifications to be processed for updating the current database 118.

In some implementations, all or a portion of the structured documents 304A, 304B, 304C, 304D may be included within a collection of structured documents 306. In some implementations, and because the instructions included in the collection of structured documents 306 indicate requested modifications to be made to update the current database 118, the collection 306 can refer to a collection of requested modifications including requested modifications 304A, 304B, 304C, 304D. Thus, for simplicity and clarity, descriptions or definitions of instructions generated or stored, such as in a markup language format, for subsequent application to the current database 118, including database structural elements or other data of the current database 118, may also be referred to herein as requested modifications, and may include proposed or requested database operations.

The structured documents of the collection 306 can reside in one or more files located on or more memories or computing devices. For example, the structured documents can reside in one or more primary memories, databases, or other structures. In some implementations, all or a portion of the collection of structured documents 306 may be stored in the memory of an application server 112 implementing the application node 114 on which the software 302 executes. In some implementations, all or a portion of the collection of structured documents 306 may be located on the application node 114 along with the executing software 302.

The requested modifications indicated by the collection of structured documents 306 may be individually applied to the current database 118, which application may include converting the instructions of the requested modifications to a format executable or interpretable by the current database 118, such as DDL, DML, or the like. The converting may include generating multiple individual database statements. The converted statements can be individually applied, executed, or otherwise performed, such as serially. A notional database 118" can be generated by converting (e.g., programmatically) individual requested modifications into corresponding individual database statements and performing all of the individual database statements to update the current database 118.

In some implementations, individually applying database statements to the current database 118 may include temporarily disabling database access by software and computer systems other than those used for managing the current database 118, such as the database management system used to apply the database statements. The disabling may occur prior to applying the database statements, and disabled database access may be restored subsequent to applying the database statements. However, in some implementations, the software and computer systems can continue to operate and access the current database 118 while it is being updated. For example, where the software associated with an update being processed is executed on a Java Virtual Machine (e.g., via the application node 114), the update can be processed while the Java Virtual Machine continues to operate. The software thus might not require a rebuild because the current database 118 accessed by the software is updated using batch modification statements for database modification generated as described herein. Updating the current database 118 in this way may reduce resource utilization and increase performance of the distributed computing system processing the software update to permit omitting the disabling of database access by applicable software.

The current database 118 may include or otherwise be operated in connection with a computerized database system, which may internally manage or control the current database 118 and may provide one or more interfaces for access to the data by external systems. The computerized database system may include modules executing on server devices of a datacenter 108. In some implementations, the computerized database system may include a batch processor 308 that may process instructions for modifying a database, for example, by identifying commonality in a target database structural element to be modified by multiple instructions of requested modifications. In some implementations, the computerized database system may include a statement processor 312 that may process, interpret, or otherwise execute one or more instructions for accessing, controlling, or managing the database expressed using a DDL or DML (e.g., a query language, such as SQL, the object query language (OQL), or the like).

The receipt, execution, or other processing of instructions (e.g., via a plugin activation, patch, version upgrade, or the like) for updating the software 302 may trigger a routine that performs the upgrade. For example, a time-based or program-based event, such as the execution of a plugin activation, patch, version upgrade, or the like, can trigger the processing of the collection of structured documents 306 by batch processor 460. In some implementations, the batch processor 308 can include instructions executable by a processor (e.g., usable by an application server 112, such as the application server 112 of the electronic computing and communication system 100 shown in FIG. 1, of a server device implementing the application server 112, or of another computing device) to identify the requested modifications included in each structured document 304A, 304B, 304C, 304D of the collection 306. In some implementations, the batch processor 308 can include a hardware component, such as a processor (e.g., a processor 202), configured to execute instructions for identifying the requested modifications included in each structured document 304A, 304B, 304C, 304D of the collection 306.

Namely, the batch processor 308 can parse the requested modifications contained in the structured documents 304A, 304B, 304C, 304D of the collection 306 to identify related requested modifications. For example, the batch processor 308 is configured to identify a common database structural element to be modified by multiple of the requested modifications within the collection 306. In response to identifying related requested modifications, for example, based on commonality of the target, the batch processor 308 can generate a single batch requested modification, or combined alteration, by combining the instructions of related requested modifications of the collection 306 directed to that particular target. For example, the batch requested modification can include all instructions for modifying TBL_1 in the current database 118. In some implementations, generating the batch requested modification can include generating new instructions indicative of the combination of requested modifications. In some implementations, generating the batch requested modification can include preserving the formatting of the corresponding structured documents, for example, by concatenating the instructions to be combined. The batch requested modification may be formatted in a markup language, such as XML or the like, or another format used to express the instructions of the related requested modifications.

The batch processor 308 may generate a batch document 310 containing the batch requested modification in response to processing the requested modifications included in the structured documents 304A, 304B, 304C, 304D of the collection 306. In some implementations, the batch processor 308 can preserve the formatting of the individual structured documents that are used to generate the batch document 310. In some implementations, the batch processor 308 can generate the batch document 310 to have a format distinct from those of the individual structured documents used to generate it. In some implementations, the batch document 310 can be formatted as an XML file, a file of another markup language, or other document or file type. In some implementations, the batch document 310 can contain one or more instructions, commands, or other statements that explicitly or implicitly direct changes to the current database 118. In some implementations, the batch document 310 can include a batch of instructions that can be used to generate one or more database statements to be performed on the current database 118.

In some implementations, the batch processor 308 can include or generate executable instructions stored in the memory of the application server 112 on which the software 302 executes. In some implementations, the batch processor 308 can be executed on a same one or more application nodes 114 that execute the software 302. In some implementations, the batch processor 308 can be executed on application nodes different from those executing the software 302.

The batch requested modification of a batch document 310 can be converted into a single database statement (e.g., a SQL statement) using the statement processor 312. In some implementations, the statement processor 312 can generate database statements by individually converting requested modifications included in the collection of structured documents 306. In some implementations, the statement processor 312 can generate database statements by converting a plurality of combined requested modifications processed by the batch processor 308. In some implementations, the statement processor 312 can generate database statements by converting a batch requested modification contained within the batch document 310, wherein the batch requested modification is generated by combining multiple requested modifications processed by the batch processor 308 into a single, combined requested modification.

The converted database statement can be applied to the current database 118 to generate an updated database 118'. Substantial computer network resources can be saved by applying a single database statement for a batch requested modification instead of separate database statements for individual requested modifications indicated by the various plugins, patches, versions upgrades, or the like associated with an update to the software 302.

In some implementations, the statement processor 312 can include executable instructions stored in the memory of a database server 116 on which the current database 118 operates. In some implementations, the statement processor 312 can be executed on a same one or more database nodes (not shown) on which the current database 118 or the updated database 118' operate. In some implementations, the statement processor 312 can be executed on database nodes different from those operating the current database 118 or the updated database 118'.

In some implementations, the updated database 118' can operate on a same database server 116 as the current database (and further, on a same or different database node (not shown) than the database node operating the current database 118). For example, the database server 116 can overwrite the current database 118 to operate or generate the updated database 118'. In another example, the database server 116 can archive the current database 118 such that the current database 118 and the updated database 118' can both operate on the database server 116.

Further, the updated database 118' generated by applying the converted batch requested modifications may be functionally equivalent to the notional database 118" that could have been generated had the individual requested modifications of the collection of structured documents 306 been separately converted to individual database statements and the individual database statements separately performed to update the current database 118 to the notional database 118". In some implementations, functional equivalence between the notional database 118" and the updated database 118' may refer to a determination that the notional database 118" and the updated database 118' function or behave in the same way despite having differences in data values or database structural elements.

In some implementations, the current database 118 may be in active use concurrently with batch requested modification. For example, the current database 118 may receive and respond to active database statements to read from the database, write to the database, or both, from various software (e.g., including one or more plugins, patches, version upgrades, or the like associated with an update to the software 302). The current database 118 can contemporaneously process batch requested modifications, which may include omitting placing the current database 118 in an offline or unavailable state or otherwise rebuilding the current database 118. For example, the current database 118 can be copied into a temporary storage usable for processing active database statements while batch requested modifications are being processed.

Although the current database 118 is referenced herein as a "current" implementation of the database accessed by the software 302, it may be the case that the actual state or condition of the current database 118 is partially or wholly unknown at the time an update is to be performed. Thus, while the current database 118 may refer to an actually current implementation of the subject database, the current database 118 may also refer to an expected implementation of the subject database, notwithstanding actual differences between what the database is expected to contain and what it actually contains or how the database is expected to behave and how it actually behaves.

Implementations of the instructions, components, modules, or the like can include configurations different from those described above or including combinations of the configurations described above. For example, the software 302 can be application software developed by a customer of a PaaS service provider based on platform software of the PaaS service provider. In some implementations, the application software can execute on a same application server 112 executing the platform software at a datacenter 108. In some implementations, the application software can execute on a server distinct from the application server 112. The application software can be controlled by the customer and accessed by clients of the customer over a computer network.

In some implementations, the update to the application software can derive from groups of customizations that can be moved from one instance of the application software to another and committed by the customer. For example, the groups of customizations can include requested modifications (e.g., expressed in a markup language, stored in a markup language file or other document, etc.) that can be processed using the batch processor 308 and the statement processor 312, as described above. In some implementations, the groups of customizations can be communicated to and applied by the PaaS service provider to facilitate the update to the application software.

In some implementations, the software 302 may be application software developed independent of a PaaS cloud computing environment. The application software may be instructions executable on a local computing device (e.g., using an operating system of the local computing device), by web browser software, or other modules, systems, platforms, or devices. For example, the application software may be software for processing documents, altering multimedia materials, managing accounting data, or another type of software. In some implementations, the application software may be software used for a database management system, such as an RDBMS. In some implementations, the application software may be or be used to operate software included within a Software-as-a-Service (SaaS) cloud computing environment.

In some implementations, the software 302 may be system software used to control devices dedicated to database operations. For example, the software 302 may include an operating system implemented on a database server device, wherein an update to the software 302 may include updating a database operating on the database server device and accessible by the operating system. In some implementations, the system software may be software used to operate infrastructure included within an Infrastructure-as-a-Service (IaaS) cloud computing environment.

In some implementations, updates made to the current database 118 to generate the updated database 118' can be processed independent of an update to the software 302. For example, instructions included in a patch, plugin, or the like may be directed to the current database 118 and not the software 302. The instructions may still include requested modifications (e.g., expressed in a markup language, stored in a markup language file or other document, etc.) that can be processed using the batch processor 308 and the statement processor 312, as described above. As such, there does not have to be an update to the software 302 in order for the updated database 118' to be generated.

Figure 4:
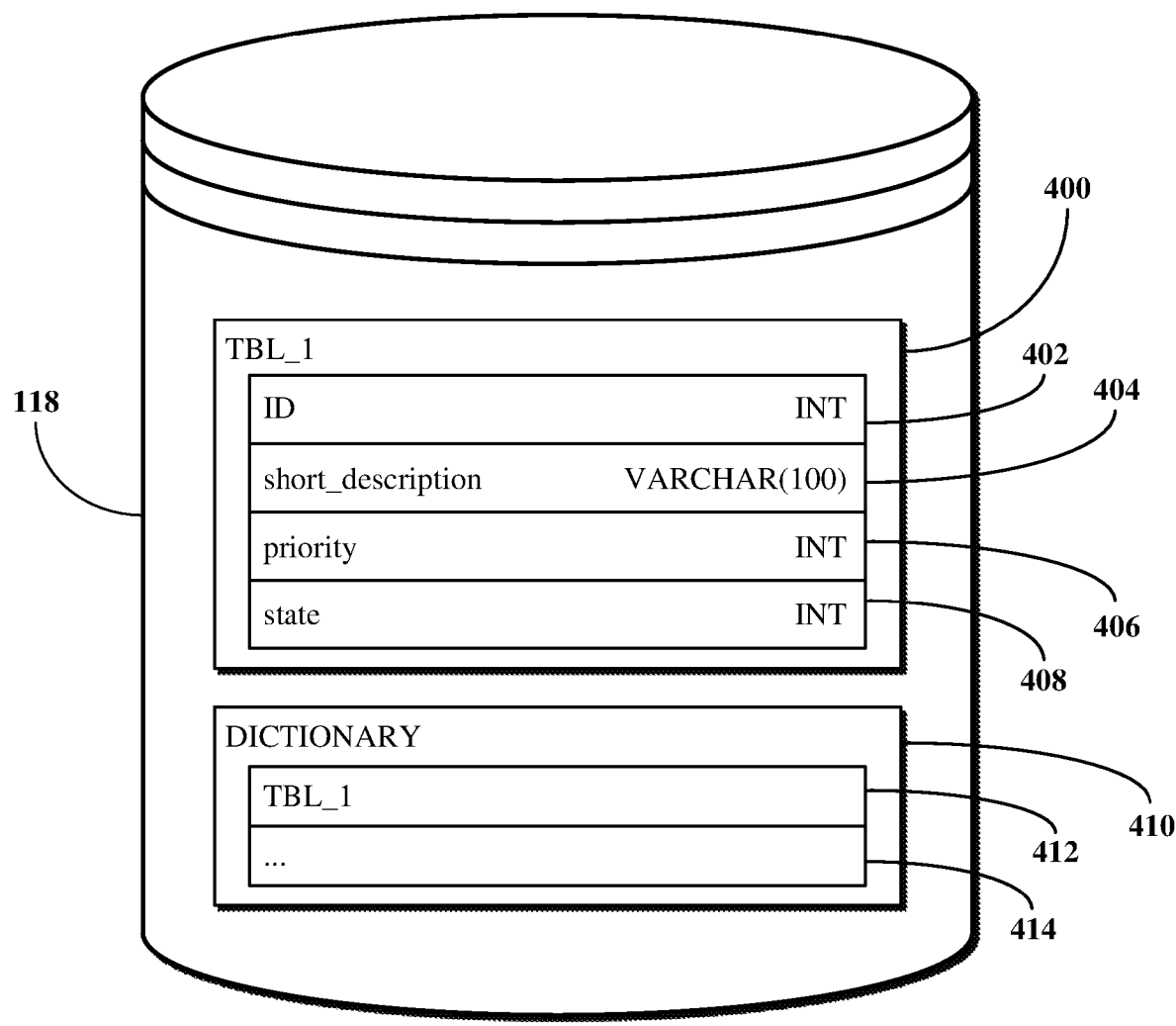
FIG. 4 shows an example of a portion of a database in accordance with implementations of this disclosure.

FIG. 4 shows an example of a portion of a database in accordance with implementations of this disclosure. The database can be the current database 118, such as the current database 118 of the electronic computing and communication system 100 shown in FIG. 1 or the computer system 300 shown in FIG. 3. As shown, the current database 118 is a relational database including a table (TBL_1) 400 and a dictionary 410. The table 400 includes a first field (ID) 402 which has a type of integer (INT), a second field (short_description) 404 which has a type of string or variable character (VARCHAR) with a defined length of 100, a third field (priority) 406 which has a type of integer, and a fourth field (state) 408 which has a type of integer. In some implementations, the dictionary 410 may be a managed database dictionary. Although shown as one unit, the dictionary 410 may include one or more tables or other database structural elements. As shown, the dictionary 410 includes an indication 412 of the table 400 and an indication 414 of other tables of the current database 118.

FIG. 5 shows an example of instructions referencing database structural elements in accordance with implementations of this disclosure. As shown, a first markup language portion, which may be a schema definition, represents an object, such as a table, in a database, such as the table 400 of the current database 118 shown in FIG. 4. The first markup language portion represents the table object, and the elements, or fields, within the table object as a hierarchical tree of nodes. The top level, or root, node 500, as shown, indicates a table object named "TBL_1". The first sub-node 502 indicates a first field named "ID", which has a type of integer (INT). The second sub-node 504 indicates a second field named "short_description", which has a type of string or variable character (VARCHAR) with a defined length or size of 100. The third sub-node 506 indicates a third field named "priority, which has a type of integer. The fourth sub-node 508 indicates a fourth field named "state", which has a type of integer. In some implementations, the first, second, third, and fourth sub-nodes 502, 504, 506, and 508 of the first markup language portion may correspond to the first, second, third, and fourth fields 402, 404, 406, 408 of the table 400 shown in FIG. 4. The markup language representation shown in FIG. 5 is a simplified representation for clarity, and other markup language representation may be used.

FIG. 6 shows examples of instructions including requested modifications to database structural elements in accordance with implementations of this disclosure. For simplicity and clarity, requested modifications included in four structured documents 304A, 304B, 304C, 304D, which may be the structured documents of the collection 306 shown in the computer system 300 of FIG. 3, are shown for modifying a database object, such as the table 400 of the current database 118 shown in FIG. 4.

A markup language portion of a first structured document 304A represents a database operation for modifying the table by adding an element 600, such as a field, named "FLD_1" and having a type of string or variable character (VARCHAR) with a defined length or size of 40. For example, the markup language portion of the first structured document 304A may represent a requested modification generated by a first plugin.

A markup language portion of a second structured document 304B represents a database operation for modifying the table by modifying the element 602 (shown at 504 in FIG. 5) by changing the size from 100 (as shown at 504 in FIG. 5) to 255. For example, the markup language portion of the second structured document 304B may represent a requested modification generated by a second plugin.

A markup language portion of a third structured document 304C represents a database operation for modifying the table by adding an index 604 named "indexN" to the table, the index including the "state" field 606 (shown at 508 in FIG. 5) and the "priority" field 608 (shown at 506 in FIG. 5). For example, the markup language portion of the third structured document 304C may represent a requested modification generated by a third plugin.

A markup language portion of a fourth structured document 304D represents a database operation for modifying the table as modified by the markup language portion of the first structured document 304A by modifying the element 610 (shown at 600 in the markup language portion of the first structured document 304A) by changing the size from 40 to 100. For example, the markup language portion of the fourth structured document 304D may represent a requested modification generated by an extension of the first plugin.

Figure 7:
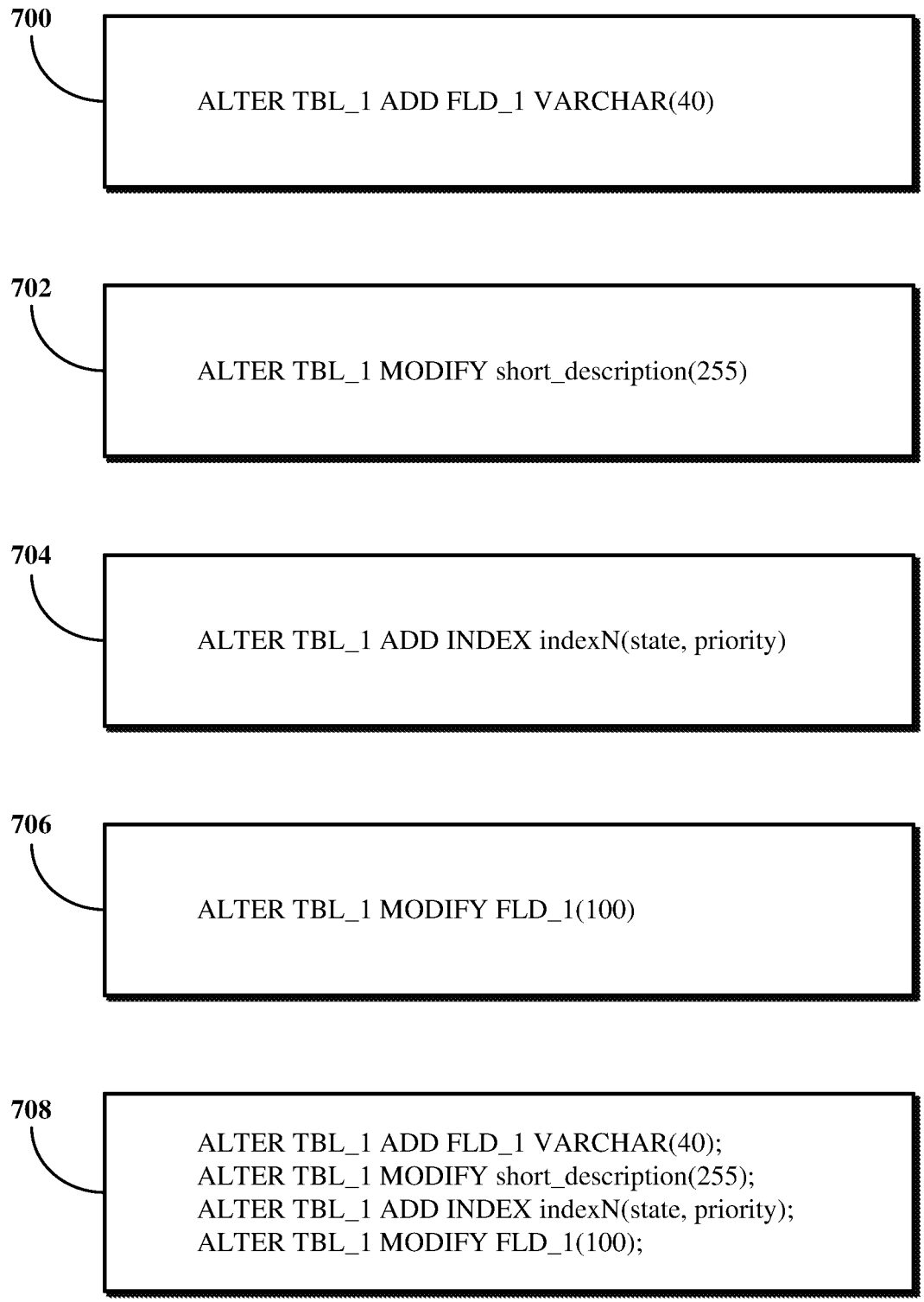
FIG. 7 shows examples of database statements representing requested modifications to database structural elements in accordance with implementations of this disclosure.

FIG. 7 shows examples of database statements representing requested modifications to database structural elements in accordance with implementations of this disclosure. For simplicity and clarity four individual database statements 700, 702, 704, 706 are shown in SQL as corresponding to respective requested modifications included in the first, second, third, and fourth structured documents 304A, 304B, 304C, 304D shown in FIG. 6. A batch database statement 708 including the four individual database statements 700, 702, 704, 706 is also shown A first database statement 700, corresponding to the markup language portion of the first structured document 304A shown in FIG. 6, indicates a database operation for modifying the table by adding a field named "FLD_1" having a type of string or variable character (VARCHAR) with a defined length or size of 40.

A second database statement 702, corresponding to the markup language portion of the second structured document 304B shown in FIG. 6, indicates a database operation for modifying the table by modifying the "short_description" field (shown at 504 in FIG. 5) by changing the size from 100 (as shown at 504 in FIG. 5) to 255.

A third database statement 704, corresponding to the markup language portion of the third structured document 304C shown in FIG. 6, indicates a database operation for modifying the table by adding an index named "indexN" to the table, the index including the "state" field (shown at 508 in FIG. 5) and the "priority" field (shown at 506 in FIG. 5).

A fourth database statement 706, corresponding to the markup language portion of the fourth structured document 304D shown in FIG. 6, indicates a database operation for modifying the table, as previously modified by the first SQL statement 700, by modifying the field "FLD_1" by changing the size from 40 to 100.

In some implementations, the individual database statements 700, 702, 704, 706 may be committed, applied, or executed, to the database independently. In some implementations, the individual database statements 700, 702, 704, 706 may be grouped together as a batch database statement 708, which may be committed, applied, or executed, to the database as a group of SQL statements.

Figure 8:
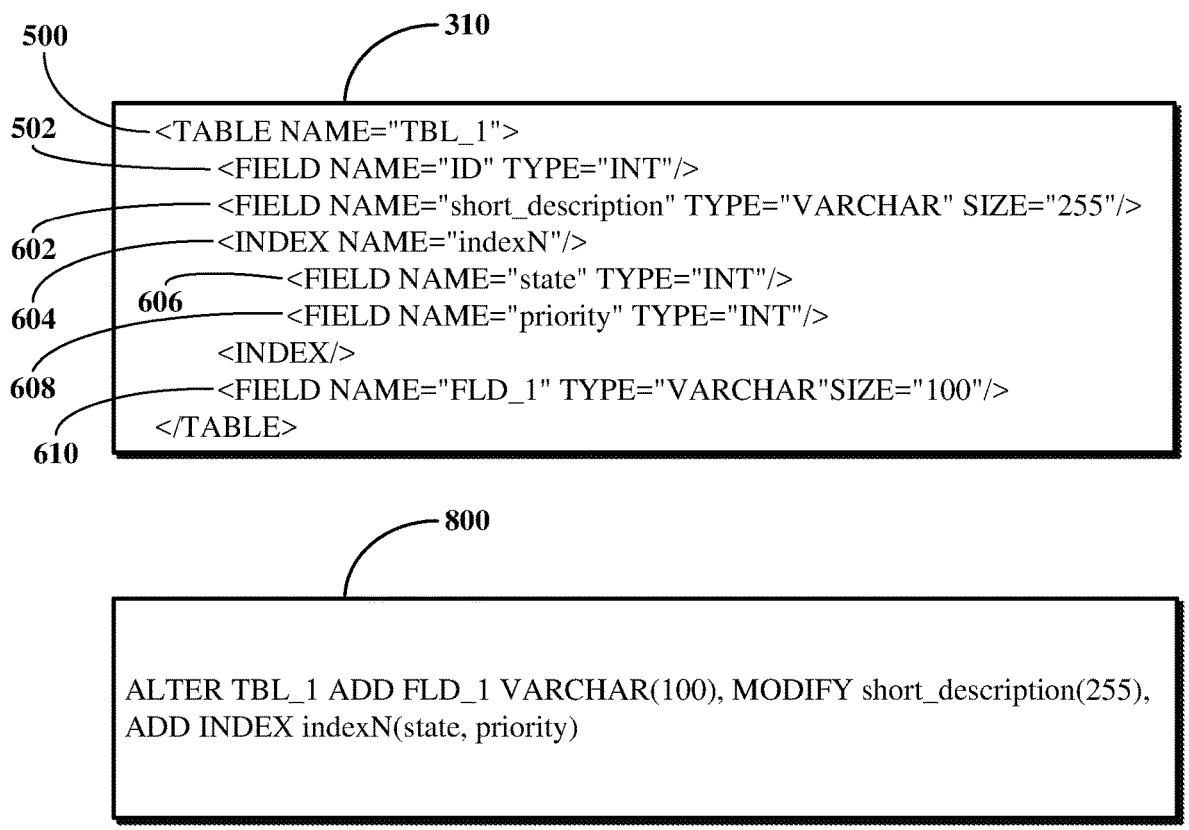
FIG. 8 shows an example of a batch requested modification and a corresponding batch database statement for modifying database structural elements in accordance with implementations of this disclosure.

FIG. 8 shows an example of a batch requested modification and a corresponding batch database statement for modifying database structural elements in accordance with implementations of this disclosure. In some implementations, requested modifications may be combined to generate a batch requested modification storable in the batch document 310, which may be the batch document 310 shown in FIG. 3. For example, the requested modifications included in the first, second, third, and fourth structured documents 304A, 304B, 304C, 304D shown in FIG. 6 may be identified as related based, for example, on the commonality of a database structural element (e.g., a table, such as TBL_1 400 of FIG. 4) to be modified by a plurality of the requested modifications. The related requested modifications may be combined into a batch requested modification, which may be contained in the batch document 310. The batch requested modification can be converted into a single, combined database statement (e.g., a SQL ALTER statement 800) to be performed as part of a database update. For example, the single, combined SQL ALTER statement 800 can be generated to include, in a single query, the requested modifications of the first, second, third, and fourth structured documents 304A, 304B, 304C, 304D shown in FIG. 6.

In some implementations, one or more subsets of requested modifications may be merged into a single subnode. For example, the requested modifications of the first and fourth structured documents 304A, 304D shown in FIG. 6 may be identified as a related subset based on commonality of the target field, FLD_1, and may be combined into a subset of requested modifications represented by a single subnode 602 of the batch requested modification contained in the batch document 310. The requested modifications of the second and third structured documents 304B, 304C shown in FIG. 6 may be included in the batch requested modification contained in the batch document 310 as respective subnodes 604, 606, 608, 610. In some implementations, a batch requested modification, such as the batch requested modification contained in the batch document 310 may be converted to a single, combined database statement, for example, the SQL query 800, and the single, combined database statement may be committed to the database via a single command.

Although the implementations discussed above with respect to FIGS. 4-8 generally describe modifying tables or columns of a relational database, the database modified by implementations of the present disclosure can be of other types and have other, corresponding database structural elements. For example, the database shown in FIG. 4 may in some implementations be an object database including a store for a first object in place of the table TBL_1 400. The requested modifications shown in FIGS. 5 and 6 may accordingly include instructions to modify variables of the first object.

Figure 9:
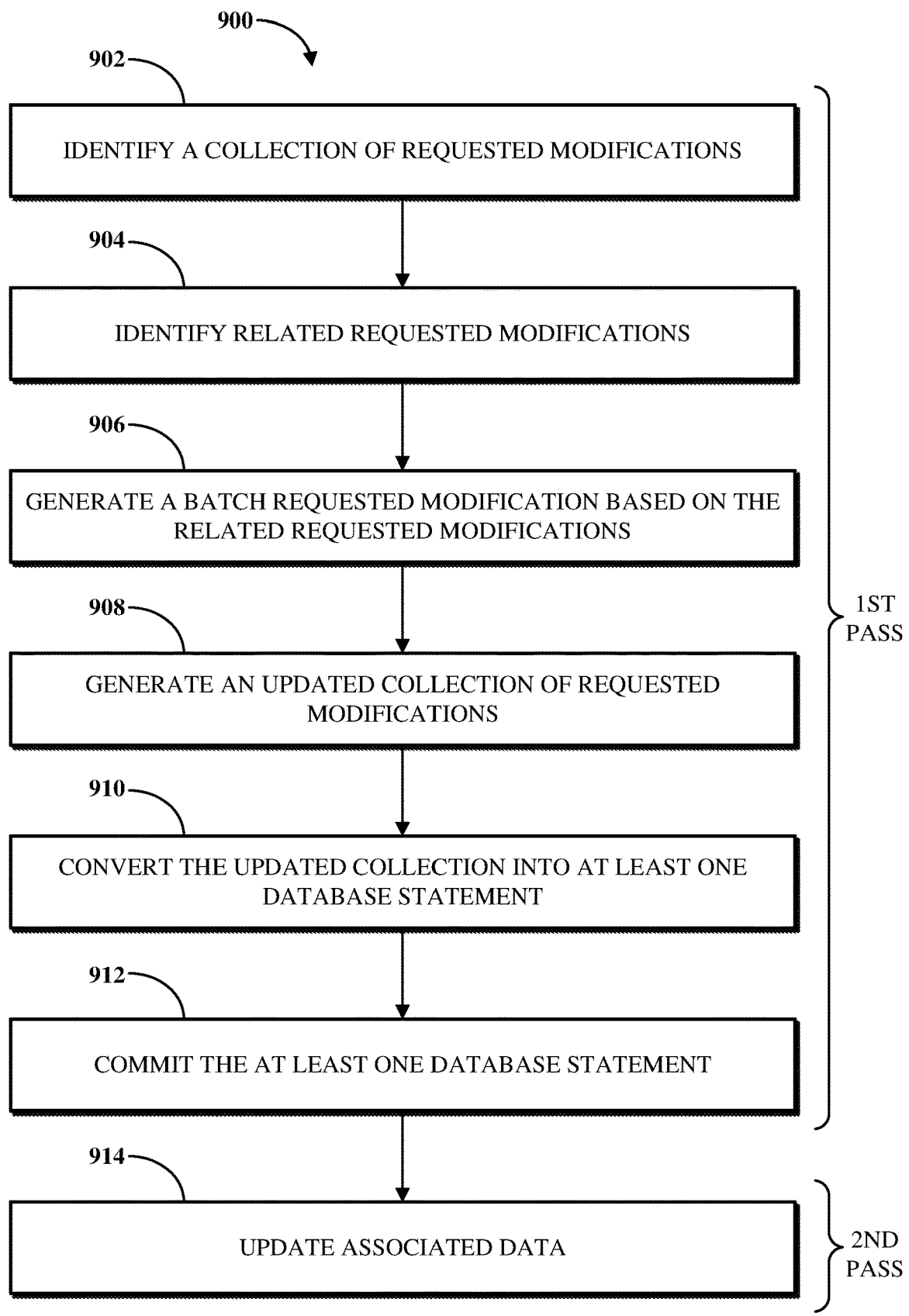
FIG. 9 is a logic flow chart illustrating an example of a method for modifying a database in accordance with implementations of this disclosure.

FIG. 9 is a logic flow chart illustrating an example of a method 900 for modifying a database in accordance with implementations of this disclosure. In some implementations, method 900 may be executed using computing devices, such as the equipment of FIGS. 1, 2, and 3. In some implementations, method 900 may be performed, for example, by executing a machine-readable program or other computer executable instructions, such as instructions or programs described according to JavaScript, C, or other such instructions.

In some implementations, method 900 may include identifying one or more requested modifications at 902, identifying related database operations at 904, generating batch requested modifications at 906, generating a set of database modifications at 908, converting commands at 910, committing the database modifications at 912, updating associated data at 914, or a combination thereof. Although method 900 is shown as a series of operations for clarity, the aspects of the systems and methods described herein may be performed in various orders and/or concurrently. Additionally, operations in accordance with this disclosure may be performed with other operations not presented and described herein. Furthermore, one or more aspect of the systems and methods described herein may be omitted.

A collection of one or more requested modifications is identified at 902. In some implementations, one or more plugins, patches, version upgrades, or other instructions, when executed, may indicate or generate one or more requested modifications. The requested modifications may be contained in and stored as one or more structured documents, such as XML files. In some implementations, one or more requested modifications may be generated independent of the plugin activation, patch, version upgrade, or the like that may trigger the method 900. For example, one or more requested modifications may be created by a database provider for generating or modifying the database. Although the requested modifications are described herein as being contained or otherwise stored in structured documents, the requested modifications may be identified from an information storage structure. For example, the requested modifications may be identified from a non-file based memory, buffer, or cache, or from a structured data storage system, such as a database. The requested modifications identified at 902 may include database operations for modifying database structural elements, data, or both.

Related requested modifications are identified at 904. Identifying related requested modifications includes determining that the instructions for two or more requested modifications identified at 902 are related based on one or more defined criteria, such as commonality of a target database structural element. For example, a single table in the database may be a target of instructions of multiple requested modifications identified at 902 and the multiple requested modifications may be identified as related requested modifications at 904. In some implementations, multiple requested modifications may be identified at 902, and multiple sets or groups of related requested modifications may be identified at 904 based on relationship criteria, such as commonality of target.

In some implementations, identifying related requested modifications at 904 may include identifying one or more sets or groups of related requested modifications based on a first or primary criterion and identifying one or more subgroups or subsets of related requested modifications within respective sets or groups or related requested modifications based on a second or secondary criterion. In some implementations, identifying related requested modifications at 904 may include determining the primacy, or hierarchy, of the criteria based on the structure of the database. For example, the structure of the database may indicate that a database structural element, such as a table, includes an element, such as field; and a first criterion for identifying related requested modifications may be commonality of a target database structural element and a second criterion for identifying related requested modifications may be commonality of target element of the target database structural element.

Batch requested modifications are generated at 906 based on the related requested modifications identified at 904. A batch requested modification is a single requested modification corresponding to a particular target for which related requested modifications are identified at 904. A batch requested modification includes a combination of instructions corresponding to the particular target and associated with the identified related requested modifications, which combination may be represented as a new requested modification generated based on the one or more requested modifications. In some implementations, generating a batch requested modification includes creating a combined markup language instruction, such as may be contained in an XML file, based on each respective set or group of related requested modifications identified at 904. In some implementations, generating a batch requested modification may include modifying an existing markup language instruction to include each respective set or group of related requested modifications identified at 904. The batch requested modification includes a combined or merged requested modification based on the related requested modifications in the combined markup language instruction. In some implementations, generating the batch requested modification may include generating, or modifying, the combined markup language instruction and storing the combined markup language instruction in a batch document or other file or data structure, for example, an XML file, a buffer, or the like.

In some implementations, the related requested modifications identified for a set or group at 904 may be represented as a respective distinct object or node in one or more batch documents, one or more other files, or in memory, and generating a batch requested modification at 960 may include reducing a cardinality of the set of related requested modifications nodes, such as by combining the distinct nodes into a single node representing a single combined requested modification. For example, each of the related requested modifications identified for a set or group at 940 may be represented as a respective sub-node within a node for the target database structural element.

In some implementations, generating a batch requested modification (which can also be referred to as a "combined alteration") at 906 may include merging two or more identified sub-sets of related requested modifications within a set of related requested modifications. For example, a set of requested modifications may be identified based on commonality of a target database structural element, and a subset of the set of requested modifications may be identified based on a commonality of target element of the target database structural element. Accordingly, conflicting alterations indicated within the requested modifications can be resolved when generating a combined alteration. In some implementations, two or more of a subset of related requested modifications may be conflicting database operations, and generating a batch requested modification at 906 may include identifying one of the conflicting requested modifications for inclusion in the combined requested modification and omitting the other conflicting requested modifications from the combined requested modification.

In some implementations, conflicting database operations included in the combined requested modification may be resolved based on one or more precedence metrics. For example, a precedence metric may indicate that a client-generated requested modification has a higher precedence than a provider-generated requested modification. In such an example, a client-generated requested modification may be identified for inclusion in the combined requested modification while a provider-generated requested modification may be omitted from the combined database operation.

In some implementations, generating a batch requested modification at 906 may include identifying a current state of one or more database structural elements in the database. For example, the current state of a database structural element in the database may be indicated in a database catalog in the database, such as the managed database dictionary or other accurate current indication of the database structural element, state, or both, and identifying the current state of database structural element in the database may include reading the database catalog. In some implementations, reading the database catalog, or otherwise identifying the current state of the database structural elements, may include representing the database structural elements, data, or both, in a markup language format, such as in XML.

In some implementations, generating a batch requested modification at 906 may include identifying an expected state of one or more database structural elements in the database. In some implementations, the expected state may be identified, expressly or implicitly, based on the requested modifications identified at 902. For example, a requested modification may expressly indicate an expected state of one or more database structural elements and may indicate a request to modify the database structural element from the expected state to a modified state. In another example, a requested modification may omit an express indication of an expected state of an object and may include a request to modify the database structural element to a modified state, and the expected state may be implicitly identified as differing from the modified state.

In some implementations, generating a batch requested modification at 906 may include determining whether a requested modification targeting a database structural element is a conflicting requested modification based on determining whether the current state of the database structural element of the database differs from the expected state of the database structural element. For example, the current state of database structural element of the database may differ from the expected state of the database structural element, and the requested modifications targeting the database structural element may be identified as conflicting requested modifications. In some implementations, generating a batch requested modification at 906 may include omitting conflicting requested modifications from the batch requested modification. In some implementations, generating a batch requested modification at 906 may include omitting one or more requested modifications associated with a conflicting requested modification from the batch requested modifications.

For example, a requested modification identified at 902 may indicate a creation of a field in a table in a database, which may expressly or implicitly indicate that the expected state for the table omits the field and which may correspond to a table schema generated by a provider of the database, the current state for the table may indicate that the table includes the field, which may indicate that a user of the database modified the table to include the field, the difference between the expected state and the current state may be identified, and the requested modification may be identified as including a conflicting requested modification.

An updated collection of requested modifications is generated at 908. The batch requested modifications generated at 906 may be included in the updated collection of requested modifications. In some implementations, one or more of the requested modifications identified at 902 may be included in the updated collection of database modifications, such as requested modifications that are not identified as related at 904. For example, a requested modification may include an instruction that lacks commonality of target (e.g., a table or other schema element) with instructions of other requested modifications, and may be included in the updated collection of requested modifications at 908.

The updated collection of requested modifications generated at 908 is converted into at least one database statement at 910. In some implementations, converting the requested modifications may include generating one or more database statements interpretable or executable by the database, such as SQL or OQL statements. In some implementations, generating the database statements may include converting the requested modifications of the updated collection of requested modifications identified at 908 to one or more database statements. For example, a requested modification indicating an instruction to add a field to a table may be converted to a SQL ALTER query. In some implementations, the requested modifications included in the updated collection can be converted into individual database statements. In some implementations, the conversion into database statements can be performed by a statement processor, for example, the statement processor 312 shown in the computer system 300 of FIG. 3.

The converted requested modifications are committed at 912. Committing the converted requested modification may include applying, executing, or otherwise performing the database statements generated at 910 to or on the database.

For example, SQL statements generated by converting the updated collection of requested modifications can be applied to a database to be updated using a SQL interpreter associated with the database. The database statements committed at 912 may be updated at 914. In some implementations, updating the committed database statements may include creating or updating database metadata, updating configuration data, updating database scripts, or other data indicating the database structural elements modified by the commit at 912, based on the requested modifications committed at 904.

In some implementations, a dictionary including database structural elements, such as tables or other database structures representing the schema of the database, can indicate that a respective database structural element in the database is included in a committed requested modification, such that the database can be updated using the committed requested modification at 914. For example, the dictionary can specify that database structural elements included within a committed requested modification have an additional field associated with them to identify their committed status. In some implementations, the updating at 914 can include identifying the database structural elements in the database indicated by the dictionary before updating the database using the committed requested modification and removing the indication for those database structural elements after the database is updated. For example, removing the indication for a respective database structural element can include removing the additional field associated with the database structural element from within the dictionary.

In some implementations, identifying one or more requested modifications at 902, identifying related requested modifications at 904, generating batch requested modifications at 906, generating an updated collection of requested modifications at 908, converting the updated collection of requested modifications at 910, and committing the converted requested modifications at 912 may be included in a first pass of a database, system, or software update, and may be performed in conjunction with other first pass update operations, such as first pass operations external to the database. In some implementations, updating associated data at 914 may be included in a second pass of the database, system, or software update, and may be performed in conjunction with other second pass update operations, such as second pass operations external to the database.

As an example use case for method 900, a collection of structured documents generated by multiple, distinct plugins associated with an application update includes a plurality of requested modifications to a database accessible by the application. The plugins can each indicate separate database structural element modifications, for example: adding a p1_field of forty characters to a first table TBL_1 (460) 421; adding a p2_field of twenty characters to a second table TBL_2 (470) 422; modifying an existing short_description field to be two hundred and fifty five characters long 423; add an index indexN to TBL_1 424; add an index idx to TBL_2 425; modify the p2_field of TBL_2 to be fifty characters long; and modify the p1_field of TBL_1 to be one hundred characters long. The plugins may indicate the separate database structural element changes by using XML ALTER Index commands included in structured documents received in connection with the plugins.

In some implementations, redundant alterations indicated by the requested modifications can be resolved when the combined alteration is generated at 906. By way of example, a field p1_field of forty characters was created 421 by plug-in PU_1 411. Plug-in PU_7, modifies the p1_field so that it is one hundred characters long. The first pass process can recognize the create and modify as being inefficient for the same variable name, and can therefore combine these two commands into a single create p1_field of one hundred characters long. The first pass process can thus look through the first memory store for instructions on common variables and combine such instructions, when possible. As such, the redundant alteration of modifying the size of p1_field is resolved when generating the combined alteration by replacing the alterations of plugins PU_1 and PU_7 with a single alteration corresponding to the size of the p1_field.

A memory store may be used to hold a combination of the plurality of requested modifications for later execution (e.g., by generating a batch document indicative of the combination), or the second pass process may execute the combination promptly upon combination (or when some predefined event or status has occurred, such as all modifications for TBL_1 have been parsed). Execution of the alter commands of the combination of the plurality of requested modifications in the second memory store may be performed on a database statement processor (e.g., a statement processor 312) that modifies the database tables TBL_1 and TBL_2. For example, the first table TBL_1 can be modified in to include an index and a p1_field, and the second table TBL_2 can be modified to include an index and a p2_field. Of significance, the combination of the plurality of requested modifications can achieve all of the changes the constituent individual requested modification instructions that make it up would have if executed individually (e.g., to update a current database to a notional database), however the combination of the plurality of requested modifications can execute more efficiently by virtue of its ability to be processed into a single database statement to be performed on the current database.

The implementations of the electronic computing and communication system, including the client 104 and the servers 112, 116 (and the algorithms, methods, instructions, etc. stored thereon and, or executed thereby), can be realized in hardware, software, or a combination thereof. The hardware can include, for example, computers, intellectual property (IP) cores, application-specific integrated circuits (ASICs), programmable logic arrays, optical processors, programmable logic controllers, microcontrollers, servers, microprocessors, digital signal processors or other suitable circuit. In the claims, the term "processor" should be understood as encompassing the foregoing hardware, either singly or in combination. The terms "signal" and "data" are used interchangeably. Further, portions of the client 104 and the servers 112, 116 are not necessarily implemented in the same manner.

Further, in some implementations, for example, the client 104 and the servers 112, 116 can be implemented using a special purpose computer, processor, which can contain specialized hardware for carrying out all or a portion of the methods, algorithms, or instructions described herein.

Further, all or a portion of embodiments of the present invention can be implemented using a special purpose computer, processor with a computer program that, when executed, carries out all or a portion of the respective techniques, algorithms and, or instructions described herein, and which can contain specialized hardware for carrying out all or a portion of the techniques, algorithms, or instructions described herein.

Implementations or portions of implementations of the above disclosures can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system to alter a database structure in a distributed computing system, the system comprising:
one or more hardware processors associated with a cloud service; and
a non-transitory memory, the non-transitory memory storing instructions that, when executed by the one or more hardware processors, causes the one or more hardware processors to perform actions comprising:
receiving a first document object comprising a first alteration to a first structural element of the database structure;
receiving a second document object comprising a second alteration to the first structural element of the database structure;
identifying a plurality of alterations to the first structural element, wherein the plurality of alterations to the first structural element comprises the first alteration and the second alteration;
resolving the plurality of alterations to the first structural element to generate a combined alteration by combining one or both of redundant or conflicting alterations of the plurality of alterations based on a precedence metric that indicates that the first document object has a higher precedence than the second document object; and
generating a database statement to alter the first structural element based on the combined alteration, wherein the database statement is used to update the database structure.

2. The system of claim 1, wherein receiving the first document object comprises receiving the first document object from a first instance of the cloud service.

3. The system of claim 1, wherein receiving the second document object comprises receiving the second document object from a second instance of the cloud service.

4. The system of claim 1, wherein generating the database statement based on the combined alteration comprises:
generating the database statement by converting the combined alteration into language interpretable by a database statement processor.

5. The system of claim 1, wherein resolving the plurality of alterations comprises:
determining that the first document object differs from the second document object in that first alteration of the plurality of alterations is different from the second alteration of the plurality of alterations; and
generating the database statement based on the identified plurality of alterations excluding the second alteration.

6. The system of claim 1, wherein the first document object comprises a first eXtensible Markup Language (XML) file, and wherein the second document object comprises a second XML file.

7. The system of claim 1, wherein the actions comprise:
executing the database statement to alter the first structural element based on the combined alteration, wherein executing the database statement is computationally less intensive than individually executing respective script associated with the plurality of alterations.

8. The system of claim 1, wherein the second alteration to the first structural element of the database structure is based on a software update.

9. The system of claim 1, wherein the plurality of alterations are expressed using a markup language and the database statement is expressed using a query language.

10. A method to alter a database structure in a distributed computing system, the method comprising:
receiving a first eXtensible Markup Language (XML) file comprising a first alteration to a first structural element of the database structure;
receiving a second XML file comprising a second alteration to the first structural element of the database structure;
identifying a plurality of alterations to the first structural element, wherein the plurality of alterations to the first structural element comprises the first alteration and the second alteration;
resolving the plurality of alterations to the first structural element to generate a combined alteration by combining one or both of redundant or conflicting alterations of the plurality of alterations based on a precedence metric that indicates that the first XML file has a higher precedence than the second XML file; and
generating a database statement to alter the first structural element based on the combined alteration, wherein the database statement is used to update the database structure.

11. The method of claim 10, wherein receiving the first XML file comprises receiving the first XML file from a first instance of a cloud service, and wherein receiving the second XML file comprises receiving the second XML file from a second instance of the cloud service.

12. The method of claim 10, wherein generating the database statement based on the combined alteration comprises:
generating the database statement by converting the combined alteration into language interpretable by a database statement processor.

13. The method of claim 10, wherein the second alteration to the first structural element of the database structure is based on a software update.

14. The method of claim 10, comprising:
executing the database statement to alter the first structural element based on the combined alteration, wherein executing the database statement is computationally less intensive than individually executing respective script associated with the plurality of alterations.

15. A non-transitory computer-readable medium comprising computer readable code, that when executed by one or more processors, causes the one or more processors to perform operations comprising:
receiving a first document object comprising a first alteration to a first structural element of a database structure;

receiving a second document object comprising a second alteration to the first structural element of the database structure;

identifying a plurality of alterations to the first structural element, wherein the plurality of alterations to the first structural element comprises the first alteration and the second alteration;

resolving the plurality of alterations to the first structural element to generate a combined alteration by combining one or both of redundant or conflicting alterations of the plurality of alterations based on a precedence metric that indicates that the first document object has a higher precedence than the second document object; and generating a database statement to alter the first structural element based on the combined alteration; and update the database structure based on the database statement.

16. The non-transitory computer-readable medium of claim 15, wherein receiving the first document object comprises receiving the first document object from a first instance of a cloud service, and wherein the operation comprising receiving the second document object comprises receiving the second document object from a second instance of the cloud service.

17. The non-transitory computer-readable medium of claim 15, wherein resolving the plurality of alterations comprises:

determining that the first document object differs from the second document object in that first alteration of the plurality of alterations is different from the second alteration of the plurality of alterations; and generating the database statement based on the identified plurality of alterations excluding the second alteration.

18. The non-transitory computer-readable medium of claim 15, wherein the first document object comprises a first eXtensible Markup Language (XML) file, and wherein the second document object comprises a second XML file.

19. The non-transitory computer-readable medium of claim 15, wherein the operations comprise:

executing the database statement to alter the first structural element based on the combined alteration, wherein executing the database statement is computationally less intensive than individually executing respective script associated with the plurality of alterations.

20. The non-transitory computer-readable medium of claim 15, wherein the second alteration to the first structural element of the database structure is based on a software update.

* * * * *